INVENTOR
GEORGE A. LATINEN
BY Cornelius H Cleary
ATTORNEY

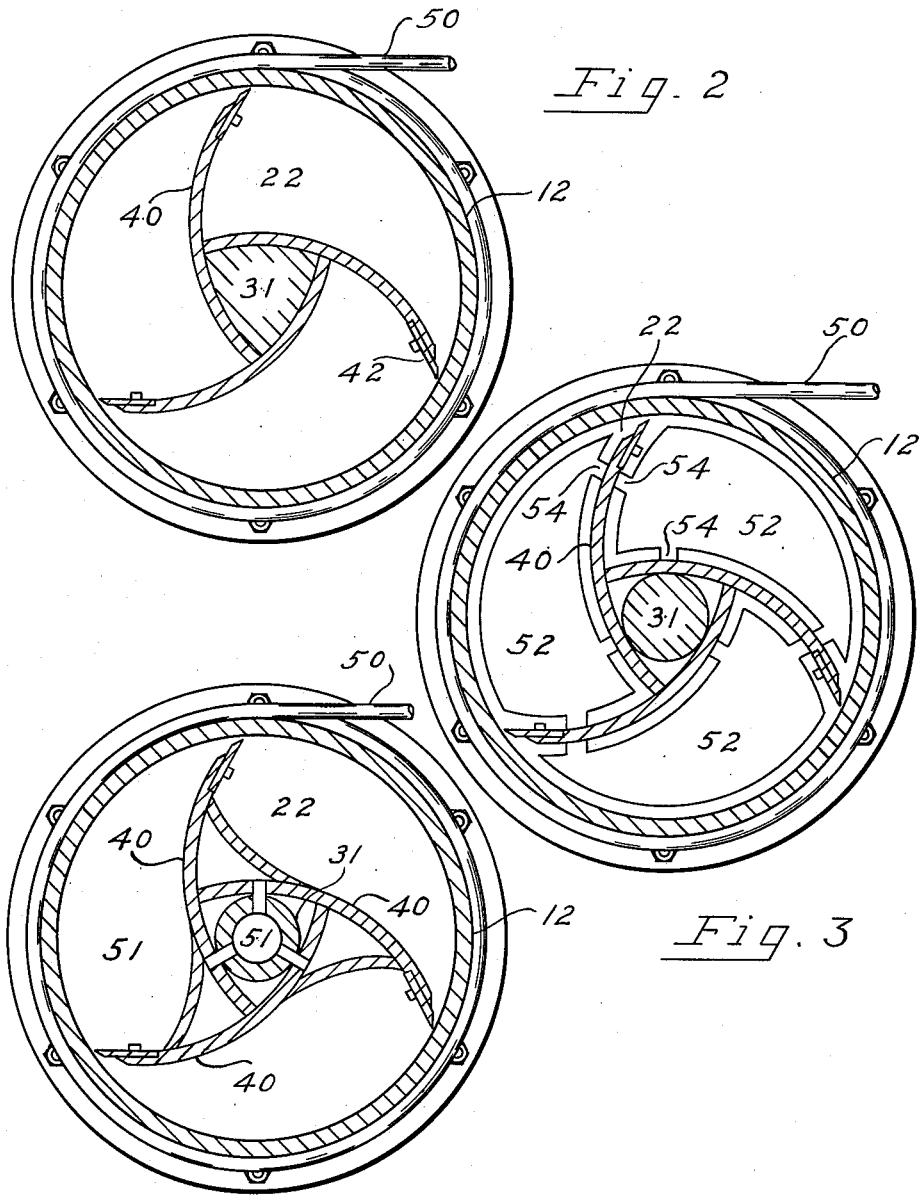

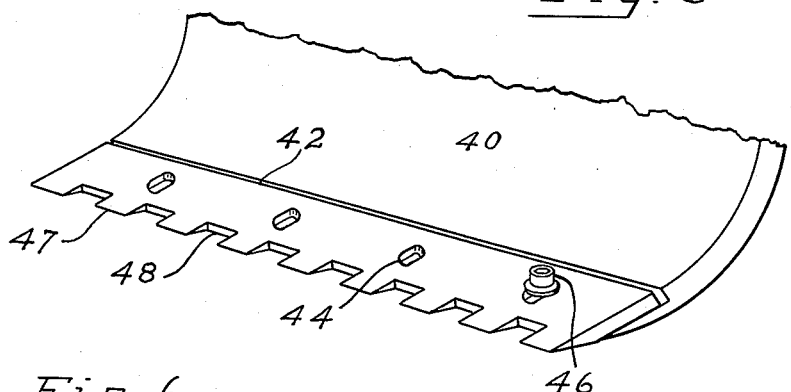
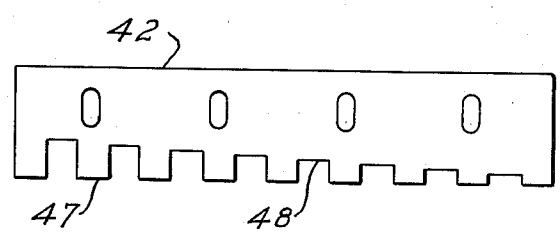
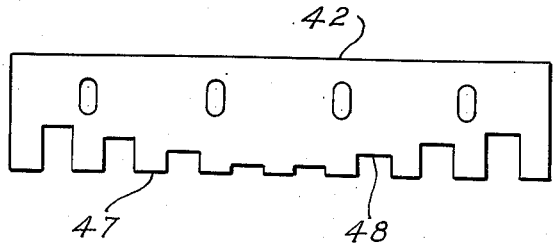

United States Patent Office 3,031,273
Patented Apr. 24, 1962

3,031,273
REACTOR FOR POLYMERIZATIONS IN VISCOUS MEDIA
George A. Latinen, Wilbraham, Mass.
Filed Mar. 23, 1959, Ser. No. 801,141
7 Claims. (Cl. 23—285)

The present invention is directed to polymerization reactors and more particularly to reactors designed to facilitate continuous exothermic polymerizations carried on in viscous reaction media.

The success of a given polymerization process is generally measured by (a) the properties, or qualities, and more specifically the uniformity of properties exhibited by the resulting polymer product and (b) the quantity of polymerized product produced from a given amount of starting monomeric material.

As compared to batch type polymerizations, continuous polymerizations carried on in viscous media are generally less successful. Incidently, by viscous media, is meant media having viscosities between $10^3$-$10^7$ centipoises at operating temperatures which may include temperatures of $-70°$ C. to $300°$ C.

In devising a continuous process for exothermic polymerizations, and conjunctively the apparatus to be used in the same, two aspects most prominently reflect on success. The first is the ability to extract excess heat generated by the reaction and the second is the capacity to provide contact between the reactants. Both must be provided for, otherwise the polymerized products which result exhibit non-uniform properties and low conversion values.

Accordingly, it is a principal object of the present invention to provide reactor apparatus in which to carry on continuous exothermic polymerization reactions in viscous reaction media.

Another object is to provide polymerization reactors in which dispersion of heat generated by the reaction as well as contact between the reactants is well provided for.

These and other objects are attained by providing a reactor comprising a cylindrical chamber formed from an externally cooled casing having terminal or end closures. For descriptive purposes, the chamber is designated with relation to an input end and an output end. A rotatable member positioned along the longitudinal axis of the chamber has a plurality of radially projecting paddles, each extending essentially the length of said chamber. The blades are provided with notched blades at their radial extremities. The rotatable member is connected to a driving means adapted to impart rotation to said member. Means for charging process material and discharging product from the chamber are provided respectively at the input and output ends of the chamber.

For a fuller understanding of the nature and objects of the presently sponsored invention, reference should be had to the following detailed description taken in connection with the accompanying drawings, in which:

FIG. 2 is an enlarged sectional end view of the present invention, taken along the line of 2—2 of FIG. 1.

FIG. 3 is an enlarged sectional end view of another embodiment of the invention.

FIG. 4 is an enlarged sectional end view of still another embodiment of the present invention.

FIG. 5 is an enlarged view with parts broken illustrating in detail the construction of one embodiment of a paddle which can be employed in the present invention, and FIG. 6 is an enlarged view in section and with parts broken showing blade detail representing an embodiment of the present invention.

FIG. 7 is an enlarged view in section and with parts broken showing blade detail representing another embodiment of the present invention.

Figure 1:
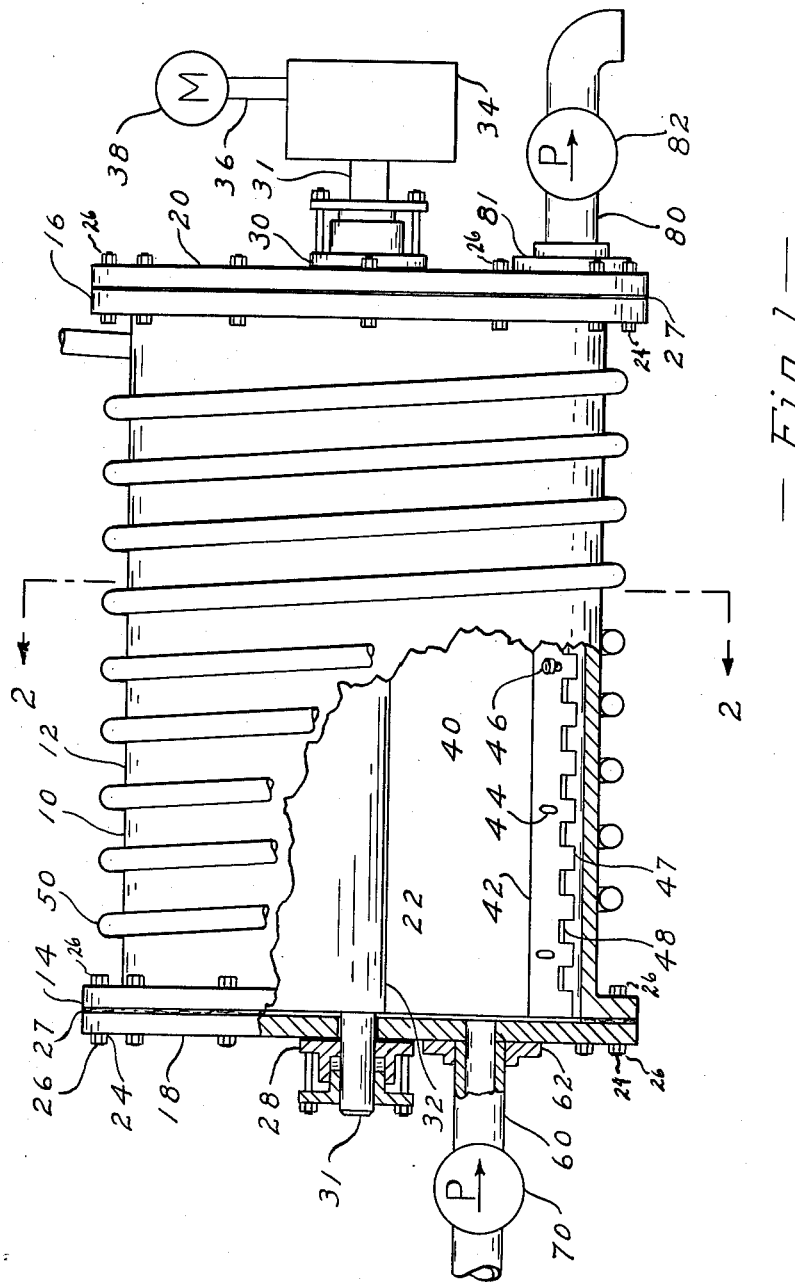
FIG. 1 is a prospective side view partly in section and with parts broken, representing an embodiment of the reactor of the present invention.

Referring to the drawings, wherein like numbers refer to like parts throughout, a reactor 10, of the type presently sponsored, is illustrated in FIG. 1. Casing 12 which is of rigid construction, i.e., metal or other heat conducting material, is provided at its ends with flanges 14 and 16 to which are attached closures 18 and 20 for defining a reaction chamber 22. To align and position closures 18 and 20, with relation to flanges 14 and 16, each is provided with complementary tap-holes, not shown. Bolts 24—24 are projected through these tap-holes and are fitted with nuts 26—26. Gasketing 27—27 is interposed between flanges 14 and 16 and closures 18 and 20 to combat leakage between the same. Closures 18 and 20 are provided with boss-type gaskets 28 and 30 through which extensions of shaft 31 of rotatable member 32 are projected. At one end, shaft 31 is connected to variable speed regulator 34 which is, in turn, connected by means of drive shaft 36 to motor 38. This latter expedient can be operated to impart variable rotational speed to rotatable member 32.

Rotatable member 32 is shown provided with radially projecting paddles 40—40 having blades 42—42 located at their outer or radial periphery. Tolerances between the peripheral extremes of blades 42—42 and the interior surface of casing 12 preferably lie between 0.001 to 0.100 inch. Referring for the moment to FIG. 5, a preferred embodiment is shown in which a paddle 40 is provided with a radially adjustable blade 42. Adjustability in the radial projection of blade 42 is facilitated by use of radially extending slots 44—44 through which to fit cap screws 46—46. This latter expedient is also shown in FIG. 1. Axial tolerances between the ends of paddles 40—40 and the inner surfaces of closures 18 and 20 are set as close as possible while allowing member 32 to be rotated.

Paddles 40—40 have an axial extension or length, substantially that of the length of chamber 22. Paddles 40—40 are shown positioned on shaft 31 in such a manner that they define between themselves sectors which are maintained substantially constant along their entire length. This can be accomplished by straight axial alignment of paddles 40—40 relative to shaft 31 or by positioning paddles 40—40 in a helical manner relative to shaft 31. The latter expedient can be practiced to provide the reactant material with added advance toward the discharge end of reactor 10. When this latter expedient is used, it is preferred that paddles 40—40 form a helix angle of 45–80° (mathematically) with the longitudinal axis of shaft 31.

That the cross-sectional construction of paddles 40—40 can be subjected to variation, is illustrated by the embodiments of the same represented in FIGS. 2, 3 and 4. Paddles 40—40 are preferably radially extended in a curvilinear manner in order to extend the effect, resulting from the provision of blades 42-42, on paddles 40—40 when the same coact with the inner surface of casing 12, upon rotation of member 32. In each of FIGS. 2, 3 and 4, paddles 40—40 are provided with a convex configuration on their advancing surface and a concave configuration at their trailing surfaces. This overall curvilinear-radial extension of the paddles serves to impart to the advancing viscous reaction materials a desirable cross-sectional recirculatory motion or shear which provides excellent contact between reactants.

The outer extremities of blades 42—42 are notched to form lands 47—47 and grooves 48—48. A particular type of notching is shown in FIGS. 5 and 6. As a result of notching, during operation of reactor 10, the reactant materials are continually forced through grooves 48—48 with the result that further contact between the reactant material is had. Additionally, the notching is preferably in complemenary relationship with regard to the several paddles 40—40, further contributing mixing or contacting of the reactants. Provision of paddles 40—40 with blade edges (in the direction of retreat as determined by the direction of rotation of member 32) as well as the close tolerances observed between the blades and the inner surface of casing 12 continually cause reactant materials to be wiped onto this inner surface in a thin film, from which the heat can then be easily extracted. Notching, of the type shown in FIGS. 5 and 6, as well as the complementary placements of lands 47—47 and grooves 48—48 between the several paddles 40—40 causing continuous repositioning of reactant materials as films contribute even more effective extraction of the heat generated by the reaction. The tolerance between the blade edges and the inner surface of casing 12 can be varied in accordance with the physical characteristics of the materials being reacted and their reaction products. This can be accomplished by adjustments facilitated by radially extended grooves 44—44 in blade edges 42—42. In a suggested embodiment the number of lands 47—47 per foot of longitudinal extension range between 3 to 15. The ratio of the length of an individual land 47 to the length of an individual groove 48 is 1:5 to 5:1.

In the embodiment shown in FIG. 6, an individual blade 42 is provided with grooves 48—48 of graduated size. When this embodiment is used in a given reactor 10, the blade next following, not shown, preferably has grooves, the size of which are graduated opposite to those of the former, and a third blade of the type shown in FIG. 7 is also included in this same embodiment. This particular embodiment can be used when an exceptional amount of contact between the reactant materials is desired.

The number of paddles 40—40 used can be varied, actually 2 to 4 in number can be used with 3 proposed as very satisfactory. Increase in this number of paddles gives a moderate increase in the amount of heat transfer, but it tends to do so in an undesirable fashion by providing relatively deeper sectorial voids between the paddles, which will inhibit radial movement of the reactant material.

To provide final removal or extraction of the excess heat generated by the exothermic reaction, heat transfer means 50 is provided externally of casing 12. This is shown in FIG. 1 taking the form of a circular conduit 50 helically coiled around the outer periphery of casing 12. A liquid coolant such as water or the like can be circulated through conduit 50. Other heat transfer means such as jacketing or the like can also be used. Further, dissipation of heat can also be had by providing a liquid coolant circulating system 51 to the interior of rotatable member 32 in the manner indicated in FIG. 4. This is a particularly desirable supplement when reactor 10 is being operated filled or near filled to capacity, with resultant build-up of heat to the interior of the reaction mass. As shown in FIG. 4, it is possible to have circulation extended to the interiors of paddles 40—40 by giving a fillet-type construction to the interior of paddles 40—40.

Additional regulation of reaction temperature can be had as shown in FIG. 3 by use of baffles 52—52 stretching between paddles 40—40. In addition to being positioned transversely of paddles 40—40, a plurality of these baffles 52—52 can be positioned in spaced relationship along rotatable member 32 and shaft 31. Baffles 52—52 also minimize channeling of the reactant material as it advances toward the discharge end of reactor 10. Stretchers 54—54 are used to attach baffles 52—52 to paddles 40—40, the spaces so formed between baffles 52—52 and paddles 40—40 effectively prevent stagnation of the reaction material otherwise possible if baffles 52—52 were extended solidly between paddles 40—40. Further, extraction of excess heat generated can be accommodated or augmented by variations in the heat transfer means 50; thus in an area where a greater amount of heat is anticipated or should be eliminated, cooling coil 50 can be supplemented by other cooling means, or cooling coil 50 can be given an added number of turns in a particularly hot spot.

Referring again to FIG. 1, charging means 60 is shown in the form of a conduit tapped into chamber 22 through flange 62 integrated to closure 18. A pump 70 is also included for the purpose of charging reactants. A discharge means located at the opposite end of apparatus 10 is shown taking the form of conduit 80 tapped through flange 81 and closure 20. This is provided with a pump 82, which serves to discharge reaction product. Pumps 70 and 82 can be operated in a manner as to cause a pressure head on the reactant material sufficient to advance the materials through reactor 10 at a regulative or predetermined rate. When reactor 10 is operated at complete fillage, only one of the pumps need be used, with incomplete fillage, both are used simultaneously.

Desired lamina flow can be had in the reaction media contained in reactor 10 when rotatable member 32 and of necessity, paddles 40—40 are rotated at 1–30 r.p.m. The size of the reaction chamber 22 is independent of rotational speed of rotatable member 32 but the properties of the product are somewhat reflected upon by the length and diameter of reaction chamber 22. The ratio of length v. diameter or $L/D$ of reaction chamber 22 preferably ranges between 1:1 to 10:1. Further variation within this range can be determined as optimum for a given fluid medium. Operation of reactor 10 can be at total fillage of reaction chamber 22, preferably however it is operated at less than this in order to impart further gravity tumbling or mixing action to the reactants. Accordingly, fillages of 10 to 90% are recommended for use where possible and further preference in this regard is directed to 35% to 75% fillage of reaction chamber 22. As occasion dictates the speed of advance, or hold-up time of the reactants within reaction chamber 22 can be varied. In this manner a large range of reaction rates using apparatus of essentially the same capacity can be enjoyed. When apparatus 10 is operated at partial fillage of chamber 22, the longitudinal axis of chamber 22 should be in a horizontal plane in order to have gravitational forces augment the mixing provided by rotatable member 32. Otherwise, at total fillage, reaction chamber 22 need not be so positioned.

In order to illustrate the operation of reactor 10, as well as the benefits which are derived from its use, the following example is included.

*Example I*

The reactor used is of the type disclosed, having a reaction chamber measuring 8 inches in diameter and 41 inches in length. A triple-paddled, solid-core rotational member having a curvilinear cross-sectional paddle configuration is located within the chamber. The blade extremities are provided with lands .625 inch long and grooves .375 inch long and .500 inch deep, the lands have a clearance of .030 inch with the interior surface of the reaction chamber. Non-catalyzed thermal mass polymerization of styrene monomer to polystyrene is continuously carried on for a period of 72 hours, during which time the rotatable member is involved at 9 r.p.m. Introduction of styrene monomer is at a steady rate of 10 lb./hour (total fillage). During this period, the temperature maintained within the chamber is about 260–265° F. The conversion of monomer to polymer during the period of operation is approximately 75% as determined on the reaction product directly upon removal from the reactor. The reaction product has a viscosity of 2–3 million centipoises.

After unreacted monomer is removed from the reaction product, the polystyrene which remains is a clear, colorless solid, the molecular weight of which is consistently within the range of 65,000 to 67,000 (Staudinger).

The reactor of the present invention can be used as a reaction site for various materials, the reactions being exothermic in nature. These can include addition polymers such as polystyrene; copolymers of styrene-acrylonitrile, styrene-methyl methacrylate, styrene-maleic anhydride; condensation polymers such as nylon, polyethylene terephthalate and the like. When condensation-type polymerizations are carried out in the subject continuous reactor, it must be operated at partial fillage.

Catalysts, chain transfer agents, stabilizers, inhibitors, colorants, plasticizers and other additives may be added initially or may be added through the cylindrical wall at various predetermined points using ports provided for this purpose.

It will thus be seen that the objects set forth above among those made apparent from the preceding description are efficiently attained and since certain changes may be made in constructing the above apparatus without departing from the scope of the invention, it is intended that all material contained in the above description shall be interpreted as illustrative and not in a limiting sense.

What is claimed is:

1. A reactor adapted for use in exothermic polymerizations continuously carried out in viscous reaction media comprising a cylindrical chamber formed by a casing provided with terminal closures and having designated an input end and an output end, means for cooling the inner walls of said casing, a rotatable member positioned along the longitudinal axis of said chamber comprising a center shaft having a plurality of radially projecting uninterrupted paddles essentially extending the entire length of said axis, said paddles having blades at their radial extremities, the outer edges of said blades being rectangularly notched at intervals and wherein the notches of the individual blades are offset with respect to those on the several blades, said rotatable member being connected to a driving means to provide rotation therein and charging and discharging means provided respectively at said input and output ends.

2. The reactor according to claim 1 wherein the paddles of the rotatable member are radially projected in a curvilinear manner and provided at their radial extremities with radially adjustable blades.

3. The reactor according to claim 1 wherein the center shaft of the rotatable member is provided with an open core through which to circulate a liquid cooling medium.

4. The reactor according to claim 1 wherein a plurality of planar open-edge baffles are attached between the paddles perpendicular to and in spaced relationship along the longitudinal axis of said chamber whereby said baffles will minimize center channeling of the reactant material thereby providing additional regulation of reaction temperature.

5. The reactor according to claim 1 wherein the rotatable member is equipped with means for rotation at between 1–30 r.p.m.

6. The reactor according to claim 1 wherein a tolerance of 0.001″ to 0.100″ is formed between the outer edges of said blades and the periphery of said chamber.

7. The reactor according to claim 6 wherein the paddles form a constant helix angle of 45–80° relative to the longitudinal axis of said chamber.

References Cited in the file of this patent

UNITED STATES PATENTS

| | | |
|---|---|---|
| 1,329,786 | Mabee | Feb. 3, 1920 |
| 1,374,928 | Kocher | Apr. 19, 1921 |
| 2,668,693 | Gard | Feb. 9, 1954 |

UNITED STATES PATENT OFFICE
CERTIFICATE OF CORRECTION

Patent No. 3,031,273                April 24, 1962

George A. Latinen

It is hereby certified that error appears in the above numbered patent requiring correction and that the said Letters Patent should read as corrected below.

Column 1, line 48, for "blades", first occurrence, read -- paddles --; column 2, line 38, after "are" insert -- also --; column 3, line 6, for "complemenary" read -- complementary --; line 25, for "blade edges" read -- blades --; column 4, line 35, for "medium" read -- media --.

Signed and sealed this 28th day of August 1962.

(SEAL)
Attest:

ESTON G. JOHNSON
Attesting Officer

DAVID L. LADD
Commissioner of Patents